United States Patent [19]
Hans et al.

[11] Patent Number: 5,123,355
[45] Date of Patent: Jun. 23, 1992

[54] ROCKET IGNITION ASSEMBLY AND MEANS AND METHODS FOR MAKING AND USING SAME

[75] Inventors: Paul C. Hans, Scottsdale, Ariz.; Daniel H. Meyer, Henderson; Gary C. Rosenfield, Las Vegas, both of Nev.

[73] Assignee: Aerotech, Inc. a Nevada Corporation, Las Vegas, Nev.

[21] Appl. No.: 517,165

[22] Filed: May 1, 1990

[51] Int. Cl.$^5$ .............................................. F42C 19/12
[52] U.S. Cl. .................. 102/202; 102/202.9; 102/202.11; 102/380; 60/39.823
[58] Field of Search .......... 102/202, 202.9, 202.11, 102/202.12, 202.14, 347, 380; 60/39.821, 39.823, 256

[56] References Cited

U.S. PATENT DOCUMENTS

| | | | |
|---|---|---|---|
| 720,073 | 2/1903 | Schmitt et al. | 102/202.11 |
| 1,935,495 | 11/1933 | Young | 102/202.11 |
| 2,437,153 | 3/1948 | Cohan | 102/202.11 |
| 2,712,270 | 7/1955 | Green | 102/380 |
| 3,363,559 | 1/1968 | Estes | 102/202.11 |
| 3,422,763 | 1/1969 | Wait | 102/202 |
| 3,447,416 | 6/1969 | Apstein | 102/202.11 |
| 3,741,120 | 6/1973 | McAllister | 102/202 |
| 4,584,925 | 4/1986 | Culotta et al. | 102/380 |
| 4,951,570 | 8/1990 | LaMura et al. | 102/202.9 |

*Primary Examiner*—Stephen Johnson
*Attorney, Agent, or Firm*—Richard R. Mybeck

[57] ABSTRACT

A novel and unique rocket ignition system comprising a novel igniter having copper foil laminated plastic substrate having a electro-conductive pyrotechnic coating disposed on one end thereof and ignitable by means of a special power-supplied igniter clip having offset positive and negative terminals for engaging the igniter and transmitting an electrical current therethrough to initiate combustion of the pyrotechnic coating which in turn ignites a rocket propellant disposed in close proximity thereto. Special means are provided to selectively position and secure the rocket ignition system to a rocket motor.

18 Claims, 1 Drawing Sheet

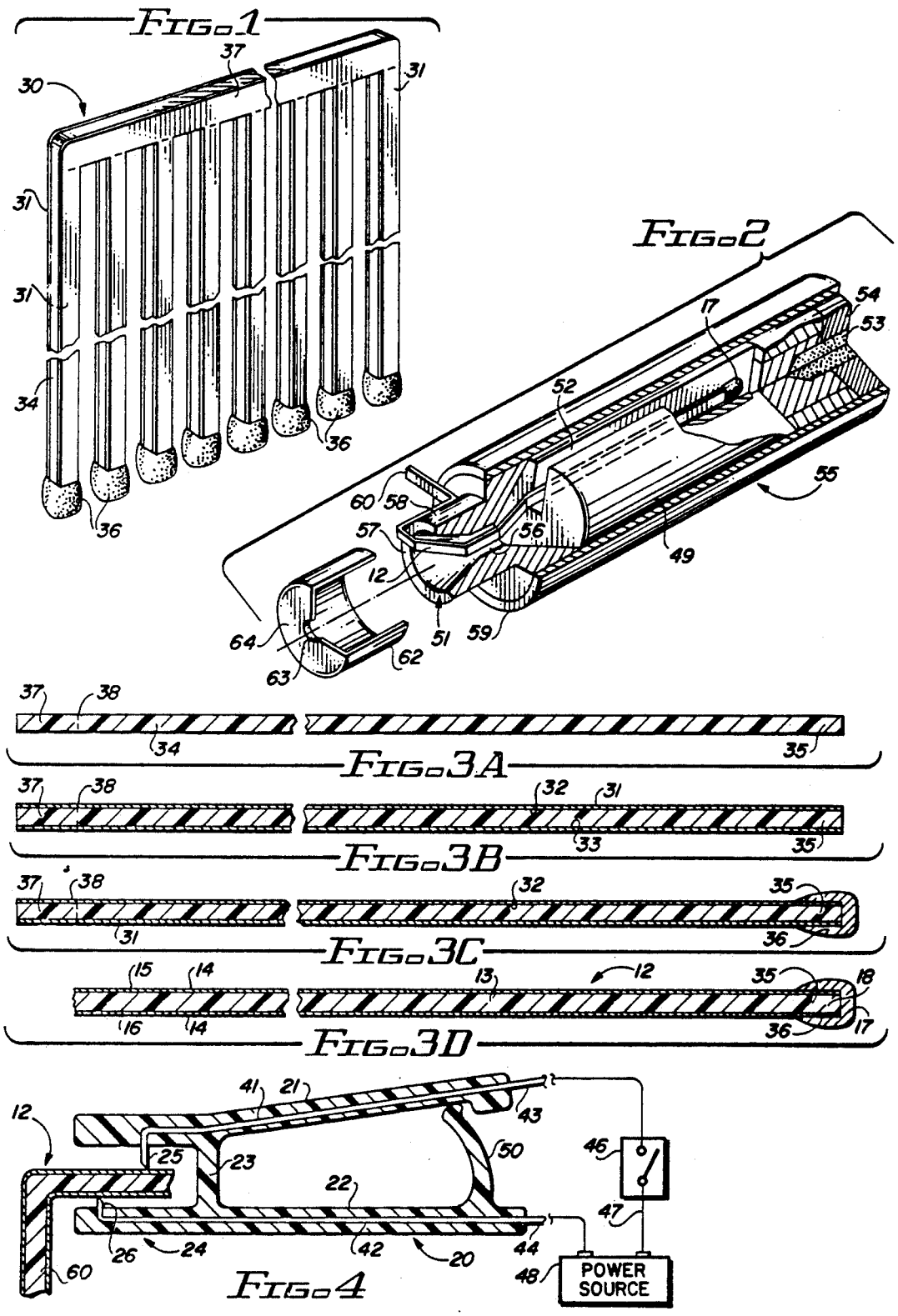

ROCKET IGNITION ASSEMBLY AND MEANS AND METHODS FOR MAKING AND USING SAME

INTRODUCTION

The present invention relates to model rockets and more particularly to a novel and unique ignition system and means and methods of manufacturing and installing such a system in a model rocket.

BACKGROUND OF THE INVENTION

For a number of years there has been an avid interest in the firing of model rockets as a recreational hobby. The firing of model rockets, requires a fail-safe ignition system because the firing of even small rockets generates dangerous amounts of energy, especially heat energy, which if unfettered, could inflict serious harm.

Multiple rocket launches usually require simultaneous firings which in the past were more difficult to control because of the problems encountered with resistance wire igniters as taught by Wait (U.S. Pat. No. 3,422,763) in which a resistance wire heats and ignites a burnable igniter cord. Resistance wiring in order to provide sufficient heat for a sure burn usually requires substantial electrical power, which heretofore is usually supplied by batteries.

The use of a two wire igniter assembly, complicated by resistor attachment, sometimes led to a no burn situation, or a safety problem because of the clutter of wiring in and around the rocket.

McAllister, in U.S. Pat. No. 3,741,120, teaches the use of a thin conductive metal foil which partially alleviated the heavy reliance on battery power. McAllister also disclosed the use of a pyrotechnic bead to complete a fuel combustion cycle which was initiated by a two wire electrical system.

In addition to the obvious safety considerations, the manufacture and distribution of rockets and rocket accessories requires competitive pricing so that both sure and safe design and economy of production are essential goals in the evolution of rocketry and are a prime objective of the present invention.

BRIEF SUMMARY OF THE INVENTION

Safety in rocket firing is of prime importance and the simplest lead wire installation assures the least possibility of either a no burn situation, a partial low power burn, or premature ignition. The present invention provides means and methods to minimize safety problems and insure dependable firing by providing a unique single lead ignition system. The ignition system hereof includes a unique elongated pyrotechnic igniter which is readily installed into a rocket motor and secured in position relative thereto by the coaction of a rocket motor nozzle and plastic retainer cap associated therewith. The igniter once installed is fired by use of a unique igniter clip. At the preselected moment activation of the igniter causes the pyrotechnic to burn and in turn ignites the rocket propellant which launches the rocket.

Accordingly, a principal object of the present invention is to provide a novel and unique rocket ignition assembly and components therefor for launching a model rocket with enhanced safety and reliability.

Another object of the present invention is to provide a new and improved rocket assembly igniter and methods of making same which is inexpensive to manufacture and requires only little skill to use.

A further object of the present invention is to provide a unique single lead igniter and clip subassembly for use therewith which is easy to install into a model rocket motor and dependable in use therewith.

These and still further objects as shall hereinafter appear are fulfilled by the present invention in a remarkably unexpected fashion as can be readily discerned from a careful consideration of the following detailed description especially when read in conjunction with the accompanying drawing in which like parts bear like numerals throughout the several views.

BRIEF DESCRIPTION OF THE DRAWINGS

In the drawings:

FIG. 1 is an isometric view of a multiple igniter substrate comb produced in accordance with one practice of the present invention;

FIG. 2 is an isometric view, partially exploded, of a rocket motor, igniter and nozzle cap-igniter holder embodying the present invention.

FIG. 3A is an enlarged cross-sectional view of a single plastic finger of the comb of FIG. 1;

FIG. 3B is an enlarged cross-sectional view of the finger of FIG. 3A having copper foil laminated on the planar surfaces thereof;

FIG. 3C is an enlarged cross-sectional view of the finger of FIG. 3B having pyrotechnic coating deposited on the tip thereof;

FIG. 3D is a cross-section view of a finished igniter embodying the present invention; and FIG. 4 is a side elevation of a igniter clip in operative association with a single lead igniter in accordance with the present invention.

DESCRIPTION OF THE PREFERRED EMBODIMENTS

The present invention relates to an ignition assembly system for use in rocketry and to methods of making and using the same. More particularly, the rocket ignition assembly of the present invention, indicated by the general reference, comprises a rocket igniter 12 having a non-conductive core portion 13 and a laminated layer 14 of copper-foil disposed upon the upper surface 15 and the lower surface 16 of body portion 13. An electrically-conductive pyrotechnic 17 is disposed on the remote tip 18 of body portion 13 as shown in FIGS. 1 and 3 and in a manner to be hereinafter described. In operation, as shown in FIGS. 2 and 4, igniter 12 is electrically connected to and secured by an igniter clip 20 when installed for use.

Igniter clip 20 comprises first handle means 21 and second handle means 22 disposed in generally spaced relationship to each other and interconnected by an intermediate web portion 23 which, as will hereinafter appear, provides a fulcrum for moving handle means 21, 22 relative to each other to open and close jaw portion 24 to receive and secure igniter 12 therewith between a first or positive terminal 25 and a second negative terminal 26. Terminals 25, 26 are integrally formed in opposing handle means 21, 22 in offset relationship to each other to secure igniter 12 therebetween for electrical ignition as will appear.

Referring to FIGS. 1 and 3, one practice for producing an igniter 12 in accordance with the present invention comprises preparing a comb 30 which may be formed of Mylar ®, Nylon ®, or suitable plastic, laminating a thin layer of copper foil 31 on the front surface 32 and the rear surface 33 of each discrete finger 34 thereof, and coating the remote ends of the foil-laminated fingers as by dipping the ends 35 thereof into a bath containing a suitable pyrotechnic solution which coats the end 35 of each finger with the pyrotechnic solution which, when dried, forms a pyrotechnic coating 36 thereupon. Each finger 34, when thus coated, will, when severed from the spine 37 of comb 30 along an appropriate score 38 (shown as a dotted line in FIG. 3) become a discrete igniter 12 for use herein in a manner to be hereinafter described.

The tip 35 of each copper-laminated plastic-film strip or finger 34 is dipped into a suitable container (not shown) in which a conductive pyrotechnic solution has been mixed and which when dried, produces pyrotechnic coating 36 upon tip 35. A preferred pyrotechnic solution contains carbon black and milled carbon fibers admixed into a high-strength high-shrink binder such as cellulose acetate, nitrocellulose, two-component epoxy, urethane, and the like. After the oxidizer/carbon/binder solution is dried on each finger 34 for several minutes, a dry electrically conductive pyrotechnic coating 36 results. The individual fingers or "strips" 34 are then detached from the backing or spine 37 of comb 30, as previously described, to provide individual rocket igniters 12.

In another practice of the present invention, a rectangular sheet of Mylar ® or the like comprises body portion 13 which is sandwiched between two like-dimensioned layers of copper-foil which are laminated thereto, one on upper surface 15 and one on lower surface 16. Next a suitable cutting means is brought down on the laminate to cut the "sandwich" to form the laminated comb 30. The comb 30 is then dipped as before to create a pyrotechnic coating 36 on the tip 35 of each finger 34 thereof and the individual fingers 34 are detached from spine 37 to create individual igniters 12.

Each igniter 12, as shown in FIGS. 3 and 4, thus comprises a plastic film body portion 13, a copper foil overlay 14 disposed on the external surfaces 15, 16 of portion 13, and an electrically conductive pyrotechnic coating 17 secured to the tip 18 thereof. In preferred practice, each igniter 12 will be from about two to about eight inches in length, depending on the length of the motor with which it will be used.

Referring now to FIG. 4, voltage is transmitted to the igniter 12 by means of igniter clip 20. Igniter clip is formed from a suitable pliable plastic material such as Nylon ®, Mylar ® or like semi-rigid non-conductive plastic and has a first copper conductor 41 imbedded in first handle means 21 and second copper conductor 42 imbedded in second handle means 22. Conductors 41, 42, respectively, provide electrical terminals as contacts 25, 26, at the distal ends 43, 44 thereof to provide respectively a positive terminal 25 and negative terminal 26. As previously described, terminals 25 and 26 are disposed in staggered or relationship to offset each other and provide both physical and electrical engagement with igniter 12. Conductors 41, 42 extend respectively along handle means 21, 22 and exit therefrom, conductor 41 being preferably connected into a suitable switching means 46 while conductor 42 is connected directly to one post of a suitable power source 48 such as a dry cell battery. The circuitry is completed by the interposition of a suitable connector 47 between switch means 46 and the free post of power source 48.

First handle means 21 of clip 20 is selectively maintained in position by restraining member 50 which is connected to second handle 22 and coacts therewith to force contacts 25, 26 into intimate contact with the copper foil 14 disposed on opposite surfaces 15, 16 of igniter 12. Clip 20 further comprises a webbed hinge member 23 which is operatively interposed between and serves as a fulcrum for the relative movement of first handle means 21 and second handle means 22 in opening and closing jaw portion 24.

In use, the arming of a rocket is accomplished, as shown in FIG. 2, by telescopically inserting igniter 12 into the rocket motor nozzle 51 and along a longitudinal slot 52 defined in rocket propellant 49 until pyrotechnic coating 17 is disposed in operative juxtaposition with the foreward end of rocket propellant 49 already disposed therewithin within motor tube 55. Igniter 12, which by its nature is very flexible, is extended through the venturi 56 in motor nozzle 51, across the annular end 57 thereof and axially back along the outer surface 58 of nozzle 51 to the proximal end of motor tube 55 whereupon igniter 12 is bent at about a 90° angle to itself and extend radially away from motor tube 55 to provide a tail 60, the purpose of which will be explained below.

Once igniter 12 is positioned in and through motor tube 55 as described, a special nozzle cap and igniter holder 62 having a central aperture or ventilator hole 63 defined in the center of surface 64, is telescopically engaged on and around motor nozzle 51 to secure igniter 12 at its desired location. Ventilator hole 63 functions to bleed the initial exhaust gases from the burning igniter 12 to prevent premature ejection of the igniter 12 and cap 62 from the motor tube 55 at the moment of launch. Ignition clip 20 is then attached to tail 60 of igniter 12 which, as shown, is remote from pyrotechnic coating 17. When attached offset terminals 25, 26 tightly and intimately engage copper foil 14 of igniter 12 and establish an electrical connection therewith. The wire conductors 41, 42 are then extended a safe distance from the firing site, preferably separated into two discrete insulated wires (not shown) and connected by means of a suitable transmission wire to the power source 48. As described, in preferred practice electrical conductors 41, 42 will be wired through a suitable safety switch 46 before being connected to power source 48. Thus wired, the electrical hook-up for the rocket is complete and the rocket, when mounted according to code, is ready for launch.

When safety switch 46 is closed, current will flow from power source 48 through the transmission line conductors 41, 42 and hence to terminals 25, 26. Terminals 25, 26, as previously described, are disposed in close offset engagement with copper foil 14 on igniter 12 and are maintained in that position by the coaction of restraining member 50 with handle means 21, 22. The current supplied by battery 48 is thus conducted into copper foil 14 and hence to tip 18 of igniter 12 where is passed through conductive pyrotechnic coating 17. The resistance offered by coating 17 to current flow therethrough causes rapid heating and ultimate ignition of pyrotechnic coating 17 which, substantially simultaneously thereafter, ignites the rocket propellant 49 thereby launching the rocket into space.

A suitable rocket propellant for use herewith contains about 82 percent (w/w) of a suitable oxidizer such as ammonium perchlorate with or without aluminum powder and 18 percent of a synthetic rubber or hydroxy terminated polybutadiene, black powder, and like propellants.

In practice, the solution from which the pyrotechnic coating 17, 36 are formed will contain (w/w) from about 2 percent to about 50 percent carbon black, from about 0 percent to about 28 percent of carbon fiber, and a sufficient amount of an oxidizer/fuel mixture to total 100 weight percent. The oxidizer/fuel mixture contains ammonium or potassium perchlorate, metal powder and a binder selected from the group consisting of cellulose acetate, nitrocellulose, two-component epoxy, and urethanes. In a preferred practice, the solution will contain in weight percent about 14 percent milled PAN carbon fiber, (available from Fortafil Fibers Inc.) about 8 percent carbon black, and 78 percent of a mixture consisting of ammonium or potassium perchlorate, nitrocellulose and aluminum powder.

It is of course understood that known functionally equivalent materials may be substitiuted for the materials recited herein without changing the nature or utility of the present invention. Further, nothing herein should be read so as to preclude the strict adherence to the Model Rocket Safety Code as adopted by the National Association of Rocketry.

From the foregoing, it becomes apparent that new improved rocket ignition assembly and means and methods of making and using the same have been herein described and illustrated which fulfill all of the aforestated objectives in a remarkably unexpected fashion. It is of course understood that such modifications, alterations and adaptations as may readily occur to an artisan having the ordinary skills to which this invention pertains are intended within the spirit of the present invention which is limited solely by the scope of the claims appended hereto.

Accordingly, what is claimed is:

1. A rocket ignition assembly comprising a housing, an igniter disposed within said housing, said igniter having an elongated electrically non-conductive body portion having an upper and a lower surface interconnected by a distal and a proximal end; a first laminate of copper foil disposed upon said upper surface of said body portion, a second laminate of copper foil disposed upon said lower surface ;and an electrically conductive pyrotechnic coating disposed upon said body portion on and adjacent to said distal end to electrically connect said first laminate and said second laminate and adapted to combustively respond to the flow of electrical current thereto; an igniter clip operatively disposed in physical and electrical contact with said igniter; and a selectively actuable power supply, said igniter clip when said power supply is activated delivering a flow of electrical current from said power supply to said igniter to initiate combustion of said pyrotechnic coating; and means for venting combustion gases from said combustion out of said housing.

2. A rocket ignition assembly according to claim 1 in which said electrically conductive pyrotechnic coating consisting of a dried product of a homogeneous solution comprising of from about 2 percent to about 50 percent (w/w) carbon black, up to about 28 percent (w/w) carbon fiber, and a remainder consisting of an oxidizer, metal powder and a high-strength high-shrink binder uniformly dispersed therethrough.

3. A rocket ignition assembly according to claim 2 in which said igniter clip comprises first handle means, second handle means, a web member operatively interposed between said first and second handle means to provide a fulcrum therebetween and a jaw portion; said first and second handle means being actuable relative to said fulcrum to open and close said jaw portion.

4. A rocket ignition assembly according to claim 3 in which said jaw portion has a positive terminal mounted in said first handle means and a negative terminal mounted in said second handle means, said negative terminal being disposed in offset relationship to said positive terminal, each of said terminals being selectively connectable to an electrical power supply and actuable into and out of conductive engagement with said igniter in response to the movement of said jaw portion.

5. A rocket ignition assembly according to claim 4 in which said positive terminal and said negative terminal coact to receive and hold said igniter therebetween.

6. A rocket ignition assembly according to claim 1 in which said igniter clip comprises first handle means, second handle means and a web member operatively interposed between said handle means to provide a fulcrum therebetween and a jaw portion; said jaw portion having a positive terminal mounted in said first handle means and a negative terminal mounted in said second handle means, said negative terminal being disposed in offset relationship to said positive terminal, each of said terminals being selectively electrically connectable to said power supply; said handle means being actuable relative to said fulcrum to open and close said jaw portion and disengage and engage said igniter with said terminals.

7. A rocket ignition assembly according to claim 6, in which said positive terminal and said negative terminal coact to receive and hold said igniter therebetween.

8. A rocket ignition assembly according to claim 1, in which said igniter clip comprises first handle means, second handle means, a web member operatively interposed between said handle means to provide said handle means with a fulcrum therebetween, and a jaw portion, said handle means being actuable relative to said fulcrum to open and close said jaw portion.

9. A rocket ignition assembly according to claim 8 in which said jaw portion has a positive terminal mounted in said first handle means and a negative terminal mounted in said second handle means, said negative terminal being disposed in offset relationship to said positive terminal, each of said terminals being selectively electrically connectable to said power supply.

10. A rocket ignition assembly according to claim 9 in which said positive terminal and said negative terminal coact to receive and hold said igniter therebetween.

11. For use in a rocket having a motor tube and motor nozzle, a rocket ignition assembly comprising an elongated igniter disposed axially along said motor tube and extending radially outwardly thereof to provide a tall, said igniter having an elongated electrically non-conductive body portion having an upper and a lower surface inter-connected by a distal and a proximal end; a first laminate of copper foil disposed upon said upper surface of said body portion, a second laminate of copper foil disposed upon said lower surface ;and an electrically conductive pyrotechnic coating disposed upon said body member on and adjacent to said distal end to electrically connect said first laminate and said second laminate and adapted to combustively respond to the flow of electrical current thereto, a cylindrical nozzle cap having a central aperture defined therein and telescopically engaged with said motor tube for venting combustion gases therefrom and to position and secure said igniter therebetween; and means connectable to said tall to transmit a flow of electrical current to said igniter.

12. A rocket ignition assembly according to claim 11 in which said electrically conductive pyrotechnic coating consists of a dried product of a homogeneous solution consisting of from about 2 percent to about 50 percent carbon black, up to 28 percent carbon fiber, and a remainder consisting of an oxidizer, a metal powder and a high-strength high-shrink binder uniformly dispersed therethrough.

13. A rocket ignition assembly according to claim 11 in which said means connectable to said tall for transmitting a flow of electrical current to said igniter comprises a single igniter clip.

14. A rocket ignition assembly according to claim 13 in which said igniter clip comprises first handle means, second handle means and a web member operatively interposed between said first and second handle means to provide said first and second handle means with a fulcrum therebetween and a jaw portion; said first and second handle means being actuable relative to said fulcrum to open and close said jaw portion about said tall.

15. A rocket ignition assembly according to claim 14 in which said jaw portion has a positive terminal mounted in said first handle means and a negative terminal mounted in said second handle means, said negative terminal being disposed in offset relationship to said positive terminal, each of said terminal being selectively connectable to an electrical power supply an actuable into and out of conductive engagement with said igniter in response to the movement of said jaw portion.

16. A rocket ignition assembly according to claim 15 in which said positive terminal and said negative terminal coact to receive and hold said igniter therebetween.

17. For use in a rocket having a motor tube and motor nozzle; a rocket ignition assembly comprising an elongated igniter disposed axially along said motor tube and extending radially outwardly therefrom to provide a tall, a cylindrical nozzle cap having a central aperture defined therein and telescopically engaged with said motor nozzle to position and secure said igniter therebetween; an igniter clip connectable to said tall to transmit electric current to said igniter; said igniter clip comprising first handle means, second handle means and a web member operatively interposed between said first and second handle means to provide a fulcrum therebetween and a jaw portion, said jaw portion having a positive terminal mounted in said first handle means and a negative terminal mounted in said handle means, said negative terminal being disposed in offset relationship to said positive terminal, said first and second handle means being actuable to open and close said jaw portion about said tall and disengage and engage said terminals in electrical contact therewith, said terminals being selectively connectable to an electrical power supply and adapted to receive a flow of electrical current therefrom.

18. A rocket ignition assembly according to claim 17 in which said positive terminal and said negative terminal coact to receive and hold said igniter therebetween.

* * * * *